United States Patent
Baldwin et al.

(10) Patent No.: US 10,137,624 B2
(45) Date of Patent: Nov. 27, 2018

(54) METHOD TO DIRECT COMPOUND EXTRUDED STRUCTURE FOR THE PRODUCTION OF IRRADIATION CROSSLINKED POLYPROPYLENE FOAM

(71) Applicant: TORAY PLASTICS (AMERICA), INC., N. Kingstown, RI (US)

(72) Inventors: Jesse Jude Baldwin, Strasburg, VA (US); Pawel Sieradzki, Winchester, VA (US); Paul Geibler, Front Royal, VA (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 0 days.

(21) Appl. No.: 15/864,618

(22) Filed: Jan. 8, 2018

(65) Prior Publication Data

US 2018/0126617 A1     May 10, 2018

Related U.S. Application Data

(63) Continuation of application No. 14/144,345, filed on Dec. 30, 2013, now Pat. No. 9,878,479.

(51) Int. Cl.

| | |
|---|---|
| *B29C 47/00* | (2006.01) |
| *B29C 44/20* | (2006.01) |
| *C08J 9/06* | (2006.01) |
| *B29C 44/34* | (2006.01) |
| *B29K 23/00* | (2006.01) |
| *B29L 31/00* | (2006.01) |
| *B29C 47/08* | (2006.01) |

(52) U.S. Cl.
CPC .......... *B29C 47/0042* (2013.01); *B29C 44/20* (2013.01); *B29C 44/3488* (2013.01); *C08J 9/06* (2013.01); *B29C 47/0854* (2013.01); *B29K 2023/10* (2013.01); *B29L 2031/00* (2013.01); *C08J 2201/026* (2013.01); *C08J 2201/03* (2013.01); *C08J 2203/04* (2013.01); *C08J 2323/02* (2013.01)

(58) Field of Classification Search
None
See application file for complete search history.

(56) References Cited

U.S. PATENT DOCUMENTS

| | | | |
|---|---|---|---|
| 4,203,815 A | 5/1980 | Noda et al. | |
| 4,410,602 A | 10/1983 | Komoda et al. | |
| 5,118,561 A | 6/1992 | Gusavage et al. | |

(Continued)

FOREIGN PATENT DOCUMENTS

| | | |
|---|---|---|
| CN | 1854126 | 12/2010 |
| CN | 102858859 | 3/2014 |

(Continued)

OTHER PUBLICATIONS

Baldwin et al., U.S. Appl. No. 14/144,986, filed Dec. 31, 2013; 37 pages.

(Continued)

*Primary Examiner* — Benjamin A Schiffman
(74) *Attorney, Agent, or Firm* — Morrison & Foerster

(57) ABSTRACT

Described herein are methods and processes of manufacturing irradiation crosslinked polypropylene foam. In some embodiments, this includes extrusion of all material components, including a liquid crosslinking agent, to manufacture extruded structures for production of irradiation crosslinked polypropylene foam.

28 Claims, 13 Drawing Sheets

(56) References Cited

U.S. PATENT DOCUMENTS

| | | | |
|---|---|---|---|
| 5,462,794 | A | 10/1995 | Lindemann et al. |
| 5,552,448 | A | 9/1996 | Kobayashi et al. |
| 5,594,038 | A | 1/1997 | Kobayashi et al. |
| 5,605,660 | A | 2/1997 | Buongiorno et al. |
| 5,646,194 | A | 7/1997 | Kobayashi et al. |
| 5,738,922 | A | 4/1998 | Kobayashi et al. |
| 5,928,776 | A | 7/1999 | Shioya et al. |
| 6,218,023 | B1 | 4/2001 | DeNicola, Jr. et al. |
| 6,251,319 | B1 | 6/2001 | Tusim et al. |
| 6,537,404 | B1 | 3/2003 | Ishiwatari et al. |
| 6,586,482 | B2 | 7/2003 | Gehlsen et al. |
| 6,586,489 | B2 | 7/2003 | Gehlsen et al. |
| 6,593,380 | B2 | 7/2003 | Gehlsen et al. |
| 6,638,985 | B2 | 10/2003 | Gehlsen et al. |
| 6,875,484 | B1 | 4/2005 | Kogure et al. |
| 6,949,283 | B2 | 9/2005 | Kollaja et al. |
| 7,083,849 | B1 | 8/2006 | Albrecht et al. |
| 7,582,352 | B2 | 9/2009 | Kobayashi et al. |
| 7,655,296 | B2 | 2/2010 | Haas et al. |
| 7,820,282 | B2 | 10/2010 | Haas et al. |
| 7,879,441 | B2 | 2/2011 | Gehlsen et al. |
| 9,663,958 | B2 | 5/2017 | Baldwin et al. |
| 9,669,600 | B2 | 6/2017 | Baldwin et al. |
| 2003/0219582 | A1 | 11/2003 | Ramesh et al. |
| 2003/0232210 | A1 | 12/2003 | Haas et al. |
| 2004/0229968 | A1 | 11/2004 | Dontula et al. |
| 2006/0276581 | A1 | 12/2006 | Ratzsch et al. |
| 2007/0287003 | A1 | 12/2007 | Matsumura et al. |
| 2010/0215879 | A1 | 8/2010 | Dooley et al. |
| 2010/0286357 | A1 | 11/2010 | Matsumura et al. |
| 2011/0014835 | A1 | 1/2011 | Sieradzki et al. |
| 2011/0244206 | A1 | 10/2011 | Penache et al. |
| 2012/0295086 | A1 | 11/2012 | Baldwin et al. |
| 2014/0061967 | A1 | 3/2014 | Stanhope et al. |
| 2014/0070442 | A1 | 3/2014 | Morita et al. |
| 2014/0170344 | A1 | 6/2014 | Pramanik et al. |
| 2014/0272380 | A1 | 9/2014 | Chapman |
| 2015/0183142 | A1 | 7/2015 | Baldwin et al. |
| 2015/0184400 | A1 | 7/2015 | Baldwin et al. |
| 2016/0185025 | A1 | 6/2016 | Baldwin et al. |
| 2016/0185079 | A1 | 6/2016 | Baldwin et al. |
| 2016/0185080 | A1 | 6/2016 | Baldwin et al. |
| 2017/0225431 | A1 | 8/2017 | Baldwin et al. |
| 2017/0246839 | A1 | 8/2017 | Baldwin et al. |
| 2018/0134005 | A1 | 5/2018 | Baldwin et al. |

FOREIGN PATENT DOCUMENTS

| | | |
|---|---|---|
| CN | 103849004 | 6/2014 |
| EP | 0679487 A1 | 11/1995 |
| EP | 0 719 626 | 7/1996 |
| EP | 1 066 958 | 1/2001 |
| EP | 0745641 B1 | 3/2004 |
| EP | 1 449 869 | 8/2004 |
| JP | 59-215329 | 12/1984 |
| JP | 7-258445 | 10/1995 |
| JP | 9-132661 | 5/1997 |
| JP | 11-302425 | 11/1999 |
| JP | 2000-37766 | 2/2000 |
| WO | WO 96/27485 | 9/1996 |
| WO | WO 2011/008845 | 1/2011 |
| WO | WO 2013/057737 | 4/2013 |
| WO | WO 2014/049792 | 4/2014 |

OTHER PUBLICATIONS

International Search Report and Written Opinion dated Mar. 25, 2015, directed to International Application No. PCT/US2014/72548; 10 pages.

Baldwin et al., U.S. Office Action dated May 2, 2016, directed to U.S. Appl. No. 14/144,345; 18 pages.

International Search Report and Written Opinion dated May 20, 2016, directed to International Application No. PCT/US2015/67875; 14 pages.

Baldwin et al., U.S. Office Action dated Aug. 25, 2016, directed to U.S. Appl. No. 14/144,986; 6 pages.

Baldwin et al., U.S. Office Action dated Oct. 3, 2016, directed to U.S. Appl. No. 14/586,745; 8 pages.

Baldwin et al., U.S. Office Action dated Oct. 6, 2016, directed to U.S. Appl. No. 14/586,721; 7 pages.

Baldwin et al., U.S. Office Action dated Jan. 25, 2017, directed to U.S. Appl. No. 14/144,345; 15 pages.

Baldwin et al., U.S. Office Action dated Jun. 6, 2017, directed to U.S. Appl. No. 14/586,721; 5 pages.

Chinese Office Action dated Aug. 1, 2017, directed to CN Application No. 201480074773.2; 21 pages.

Extended European Search Report dated Aug. 23, 2017, directed to European Application No. 14876099.4; 9 pages.

Baldwin et al., U.S. Office Action dated Oct. 6, 2017, directed to U.S. Appl. No. 14/586,781; 8 pages.

Baldwin et al., U.S. Office Action dated Dec. 27, 2017, directed to U.S. Appl. No. 15/581,503; 6 pages.

Baldwin et al., U.S. Office Action dated May 17, 2018, directed to U.S. Appl. No. 14/586,781; 9 pages.

Chinese Office Action dated Apr. 18, 2018, directed to CN Application No. 201480074773.2; 7 pages.

Baldwin et al., U.S. Office Action dated Apr. 5, 2018, directed to U.S. Appl. No. 15/818,691; 6 pages.

European Search Report dated Sep. 14, 2018, directed to European Patent Application No. 15876173.4; 18 pages.

Extended European Search Report dated Sep. 13, 2018, directed to European Application No. 18180821.3; 7 pages.

Japanese Office Action dated Aug. 13, 2018, directed to Japanese Application No. 2016-544141; 7 pages.

METHOD TO DIRECT COMPOUND EXTRUDED STRUCTURE FOR THE PRODUCTION OF IRRADIATION CROSSLINKED POLYPROPYLENE FOAM

CROSS-REFERENCE TO RELATED APPLICATION

This application is a continuation of U.S. patent application Ser. No. 14/144,345, filed on Dec. 30, 2013, the entire contents of which is incorporated herein by reference.

FIELD OF THE INVENTION

The present invention relates to manufacturing irradiation crosslinked polypropylene foam. More specifically, the invention relates to methods and processes for manufacturing extruded structures for the production of irradiation crosslinked polypropylene foam.

BACKGROUND OF THE INVENTION

Specialty foams may be manufactured using a process that includes grinding materials, blending materials, extrusion, irradiation and foaming. This process may produce irradiation crosslinked polypropylene foam, which can be used for automotive interior trim applications, for example.

FIG. 1 shows auxiliary components used in a conventional process to manufacture irradiation crosslinked polypropylene foam. The process shown in FIG. 1 includes components for grinding materials, mixing a blend, extrusion, irradiation and foaming. Although any combination of these steps may be performed at a single location, they may also be performed at different locations to minimize costs. For example, manufacturing foam at the same production site where material ingredients are blended and extruded is often more costly than simply shipping extruded structures for subsequent foaming elsewhere. Extruded structures are more compact for transport to another site where foaming can be performed by, for example, an automobile manufacturer.

In step 100 of FIG. 1, resins are initially transported to a production site and fed to a grinder that pulverizes the resins into a powder form. The resins are formed as pellets, granules, chips, flakes, beads, cylinders, tubes, or the like, before being pulverized into a powder form. In step 102, powdered resins are stored in a raw materials silo along with other material ingredients. In step 104, the powdered resin and other material ingredients are blended together by using a Henschell type mixer. The other material ingredients may include an antioxidant package, a crosslinking agent, a blowing agent (i.e., foaming agent), and the like. In step 106, the blended material mixture is extruded into structures by using a die on a parallel twin screw extruder that has a short length to diameter (L/D) ratio, which minimizes shear and residence time. In step 108, an electron beam is used to produce irradiation crosslinked structures. The foaming process of step 110 includes pre-heating the irradiation crosslinked structure, followed by a salt bath that is used as a heat conducting medium to activate the blowing agent in the irradiation crosslinked structure to create foam. In step 112, the foam is cooled, washed, and wound.

Other conventional methods for manufacturing crosslinked foam may use chemical crosslinking, instead of radiation to produce irradiation crosslinked polypropylene or polyethylene foam. However, chemical crosslinking yields foam that may not be used for automotive interior trim applications because the foam is not smooth. A smooth surface is typically used for automotive interior trim because these applications include a bi-laminate of foam and a laminated foil of TPO or PVC. Consequently, chemical crosslinking is of limited use for these types of applications because it does not yield uniform foam cells. Other known methods include reactive extrusion, where a chemical reaction or crosslinking takes place during the extrusion process.

Accordingly, a need exists for manufacturing irradiated cross-linked foams in a low cost and efficient manner.

SUMMARY OF THE INVENTION

Described herein are methods and processes for manufacturing irradiation crosslinked polypropylene foam that eliminates the steps of grinding and mixing materials prior to extrusion, which are used in conventional manufacturing methods. Eliminating the grinding and mixing steps provides an advantage over conventional methods because it lowers manufacturing costs while still yielding high quality extruded structures.

In some embodiments, a method of manufacturing an extruded structure includes introducing resin into a feeder of an extruder, introducing a liquid crosslinking agent into the extruder at a location downstream of the feeder, introducing a chemical blowing agent into the extruder at a location downstream of the location where the liquid crosslinking agent is introduced into the extruder, and extruding a structure from the extruder. In some embodiments, the method further includes irradiating the extruded structure to produce a crosslinked extruded structure. In some embodiments, the method further includes foaming the crosslinked extruded structure to produce a foam structure.

In some embodiments, the foaming includes pre-heating the crosslinked extruded structure. In some embodiments, the foaming includes using a salt bath as a heat source to activate the chemical blowing agent in the crosslinked extruded structure. In some embodiments, the foaming includes using a radiant heater, a hot air oven, or microwave energy as a heat source to activate the chemical blowing agent in the crosslinked extruded structure.

In some embodiments, the chemical blowing agent is introduced into the extruder through a side stuffer downstream of a location where the liquid crosslinking agent is introduced into the extruder.

In some embodiments, the resin introduced into the feeder has a non-powder form. In some embodiments, the resin is formed as pellets, granules, chips, flakes, beads, cylinders, or tubes. In some embodiments, the resin includes a polypropylene based polymer that includes MAH-g-polypropylene, impact modified polypropylene, polypropylene-ethylene copolymer, MAH-g-polypropylene-ethylene copolymer, metallocene polypropylene, metallocene polypropylene-ethylene copolymer, metallocene polypropylene olefin block copolymer with a controlled block sequence, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

In some embodiments, the extruded structure has a sheet-like profile and is a film, a web or a sheet.

In some embodiments, the extruding is performed with a co-rotating, twin screw extruder. In some embodiments, the extruder has a length to screw diameter ratio of 36:1 to 52:1. In some embodiments, the extruder has a length greater than 20 screw diameters. In some embodiments, the feeder is located within an initial 4 screw diameters, the liquid crosslinking agent is introduced into the extruder within 4 to 8 screw diameters and the blowing agent is introduced into the extruder within 16 to 20 screw diameters. In some embodiments, each twin screw has a diameter of 60 to 100 mm.

In some embodiments, a temperature within the extruder is maintained at least 10 degrees Celsius below a thermal decomposition initiation temperature of the chemical blowing agent.

In some embodiments, the chemical blowing agent has domains each of a radius size less than 16 μm in the extruded structure. In some embodiments, the liquid crosslinking agent is divinylbenzene. In some embodiments, the chemical blowing agent is azodicarbonamide. In some embodiments, the foam has a density of 20 to 250 kg/m$^3$.

In some embodiments, a method for manufacturing an extruded structure includes introducing resin at a first zone of the extruder, introducing a liquid crosslinking agent at a second zone of the extruder. The second zone is downstream of the first zone. The method also includes introducing a chemical blowing agent at a third zone of the extruder, and extruding a structure at a fourth zone of the extruder. In some embodiments, the method further includes irradiating the extruded structure to crosslink the resin of the extruded structure. In some embodiments, the method further includes foaming the irradiated crosslinked structure to produce a foam structure. In some embodiments, the third zone is downstream of the second zone.

In some embodiments, the extruded structure includes 30 to 80% polypropylene. In some embodiments, the crosslinked composition has a crosslinking degree of 20 to 75%.

In some embodiments, the extruding is performed with a co-rotating, twin screw extruder having a length greater than 20 screw diameters. The first zone is within the initial 4 screw diameters. The second zone is within 4 to 8 screw diameters. The third zone is within 16 to 20 screw diameters.

In some embodiments, an extruded structure is produced by a method. The method includes introducing resin into a feeder of an extruder, introducing a liquid crosslinking agent into the extruder at a location downstream of the feeder, introducing a chemical blowing agent into the extruder, and extruding a structure from the extruder. The chemical blowing agent has domains, each of a radius size equal to or less than 16 μm in the extruded structure.

BRIEF DESCRIPTION OF THE DRAWINGS

Exemplary embodiments of the invention will now be described with reference to the accompanying drawings, in which.

DETAILED DESCRIPTION OF THE INVENTION

Described herein are methods and processes of manufacturing irradiation crosslinked polypropylene foam. In some embodiments, this includes extrusion of all material components, including a liquid crosslinking agent, to manufacture extruded structures for production of irradiation crosslinked polypropylene foam. Extruded structures may be produced at one location, irradiated at a different location, and converted to foam at yet another location. An extruded structure, as referred to herein, has a sheet-like profile and may be a film, a web, a sheet, or the like. The process of producing an extruded sheet structure may also be referred to herein as sheeting. Accordingly, this disclosure describes the manufacture of extruded structures as a separate process from irradiation and foaming, although they can all be part of the same process in some embodiments.

Conventional methods to produce irradiation crosslinked polypropylene foam include separate steps of pulverizing, blending all material components together in a Henschel mixer, extruding the blended material using a counter-rotating extruder with a short length to diameter ratio (L/D), crosslinking the extruded structure using an electron beam, and then foaming the crosslinked structure using a heat conducting medium to activate the chemical blowing agent.

In conventional methods, the resin pellets are pulverized into powder before mixing the powdered resin together with other material ingredients. A powder form of resin facilitates adsorption of the liquid crosslinking liquid agent, such as divinylbenzene (DVB), in the mixture. Adsorption is a process of a liquid adhering to the surface of the adsorbant, which in this case is the pulverized resin. Using non-powdered resin can prevent the liquid crosslinking agent from being adsorbed by the mixture because it settles to the bottom of a mixer or storage container. Powdering the resin also facilitates creation of a homogenous blend of material components in the mixture because many additives are also formed as fine powder. For example, the chemical blowing agent azodicarbonamide (ADCA) is 18-30 microns in size.

Figure 1:
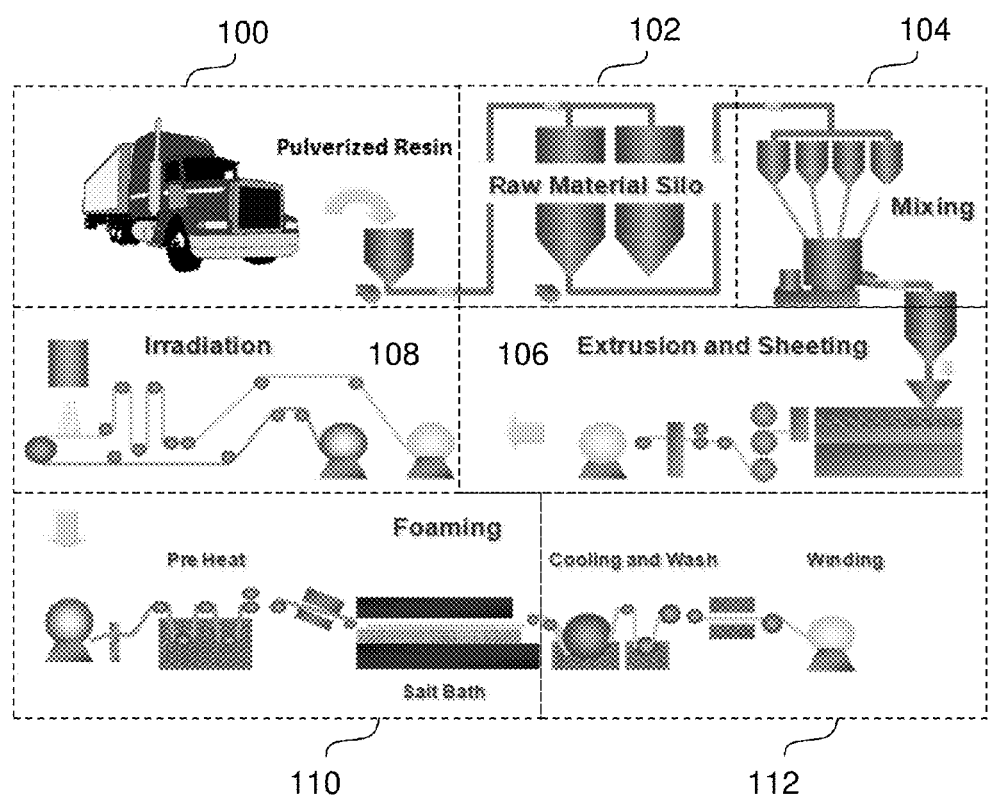
FIG. 1 shows auxiliary components used in a conventional process to manufacture irradiation crosslinked polypropylene foam.
Figure 2:
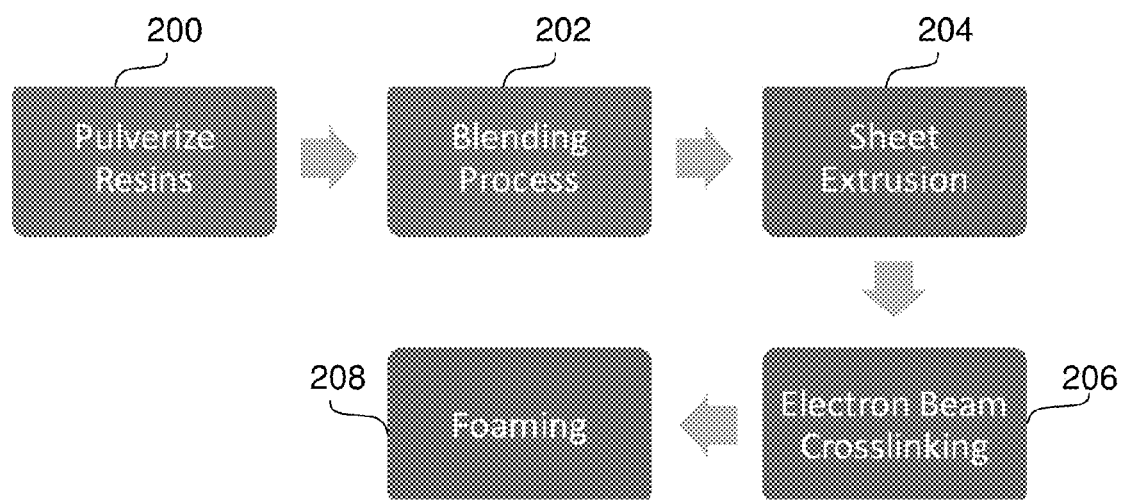
FIG. 2 is a flow diagram showing a conventional process to manufacture irradiation crosslinked polypropylene foam.

FIG. 2 is a flow diagram showing a conventional process to manufacture irradiation crosslinked polypropylene foam. At 200, resins are pulverized from pellets to a powder form. At 202, the powdered resins and other material ingredients are blended into a mixture. At 204, an extruder is used to produce an extruded structure, such as a sheet. At 206, an electron beam is used to produce an irradiation crosslinked structure. At 208, the irradiation crosslinked structure is converted into a foam product.

Unlike conventional methods, the described methods and processes allow for the manufacturing of extruded structures from a mixture of material ingredients that includes a resin, a crosslinking agent, and a chemical blowing agent that are all inputted directly into an extruder. This is advantageous because it eliminates the need to pulverize resins, and eliminates the need for a separate mixer to blend the pulverized resin with other material ingredients. This is also advantageous because extruded structures can be produced without requiring those additional steps, labor, and capital to create powdered resin in a blend with other materials. Operating costs are further reduced because eliminating the need to pulverize resin eliminates the need for cryogenic liquid nitrogen to pulverize softer olefinic material.

Figure 3:
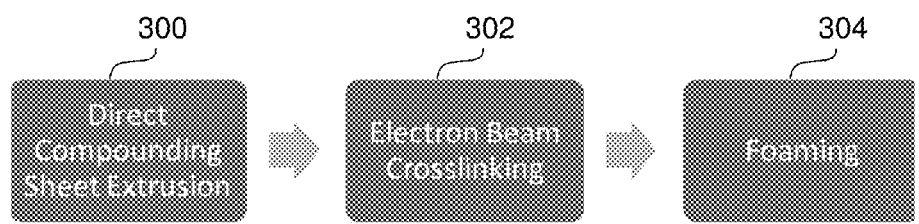
FIG. 3 is a flow diagram showing a process to manufacture irradiation crosslinked polypropylene foam without the pulverizing and blending steps used in conventional processes, according to embodiments of the invention.

FIG. 3 is a flow diagram showing a process to manufacture irradiation crosslinked polypropylene foam without the conventional pulverizing and blending steps in the process shown in FIG. 2. At 300, direct compounding is used for sheet extrusion by introducing all material ingredients directly into an extruder to produce an extruded structure. At 302, an electron beam is used for crosslinking extruded structure. At 304, a foaming process converts the irradiation crosslinked structure into polypropylene foam.

Pulverizing and Blending

Suppliers usually provide resins in pellet form. The pellets may range in size from 2 to 10 mm. The resin pellets may be pulverized as part of an overall manufacturing process, or pulverized at a remote location before extrusion and sheeting. Cryogenic grinders use liquid nitrogen to facilitate grinding of soft olefin materials without heat generation and clumping. Although using liquid nitrogen facilitates grinding, it is not necessary required to yield powdered resins. Resin may also be obtained as flakes or in powder form, directly resulting from a polymerization reactor. Reactor flakes or powder can have the particle size distribution shown in TABLE 1 below, as measured according to ASTM D5644. In some cases, resins of smaller sizes do not need to be pulverized and are ready for used in blending.

TABLE 1

| Particle Size % | | | | | | | |
|---|---|---|---|---|---|---|---|
| 10 mesh | 20 mesh | 35 mesh | 60 mesh | 100 mesh | 140 mesh | Pan | Total = 100% |
| 3.65 | 39.49 | 26.57 | 17.40 | 6.95 | 2.94 | 2.99 | 100 |

After pulverizing pellets, resins generally has a particle size distribution shown in TABLE 2. Thus, the size of the resin can be reduced to less than approximately 2 mm. For olefinic materials, such as polypropylene or polyethylene, the bulk density after pulverizing is generally between 25-55 g/100 cc, as measured per ASTM D1895.

TABLE 2

| Particle Size % | | | | | | | |
|---|---|---|---|---|---|---|---|
| 10 mesh | 20 mesh | 35 mesh | 60 mesh | 100 mesh | 140 mesh | Pan | Total = 100% |
| 0.20 | 12.16 | 38.95 | 36.75 | 9.65 | 2.35 | −0.06 | 100 |

Pulverized resin can be combined with other ingredients and additives into a mixer to blend all material ingredients together. The mixer may be, for example, a Henschell type mixer. The material ingredients may include, for example, pulverized resins or reactor flakes, a liquid crosslinking agent, a chemical blowing agent, an antioxidant package, and any other types of additives. The material ingredients are scaled gravimetrically to the mixer in a precise sequence of steps so that no clumping occurs when blending the batch of material ingredients. This batch of materials is mixed at a low speed for a period of time, then at a higher speed. Generally, the mixing time involves a total of approximately 9-10 minutes per blend batch.

Extrusion

Extrusion is a process used to create structures having a fixed cross-sectional profile. An extruder is used to create extruded structures. The methods and processes described herein eliminate the steps of pulverizing resins and pre-blending material ingredients because all material ingredients can be fed directly into an extruder. Material ingredients can be fed through a single port of the extruder, or each ingredient can be individually fed to the extruder through separate ports, or combinations thereof. Pre-blending ingredients of a foam composition may be performed to facilitate their dispersal, although it is not necessary. A Henshell mixer may be used for such pre-blending.

Described herein is an extrusion process that includes the step of injecting a liquid crosslinking agent directly into an extruder for manufacture of an extruded structure, such as foam sheets or films. In some embodiments, these types of compounded sheets are produced without grinding materials and blending a mixture of the materials before introducing the blend into the extruder. Thus, an extrusion process is used to make irradiation crosslinked polypropylene compounded foam sheet products without pre-grinding or pre-blending materials.

Figure 4:
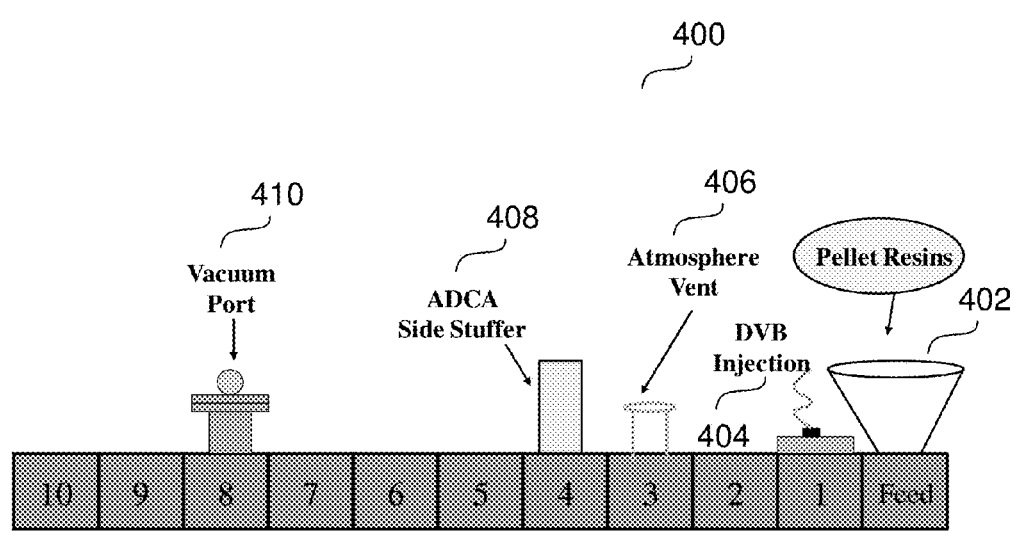
FIG. 4 is a diagram of a co-rotating extruder used for a direct compounding extrusion process, according to embodiments of the invention.

FIG. 4 depicts a diagram of a co-rotating extruder used for a direct compounding extrusion process. In some embodiments, different combinations of raw materials are fed to different ports of the co-rotating extruder 400 shown in FIG. 4. Depending on a foam product being produced, different raw materials are fed directly to the co-rotating extruder to achieve a compounded extruded structure used for the manufacture of an irradiation crosslinked polypropylene foam with a specific target thickness, density, and crosslinking value. Thus, various factors affect the extrusion process, including a targeted thickness, density, foam type, and the like.

The different ports in FIG. 4 include a feeder 402 for resin, a port for a liquid crosslinking agent 404 (e.g., a DVB injector), a port for a chemical blowing agent 408 (e.g., an ADCA side stuffer), and a vacuum port 410. Extruder 400 may also include an atmosphere vent 406.

Extruder 400 includes multiple barrel sections or zones. Each barrel section represents an axial length of, for example, 4 diameters (4D). In particular, extruder 400 depicts a feed section and ten other sections that are downstream of the feed section. Although the number of barrels may vary according to different embodiments, the total extruder length should be sufficient for mixing material components to yield a blend with uniform dispersive and distributive properties.

Figure 5:
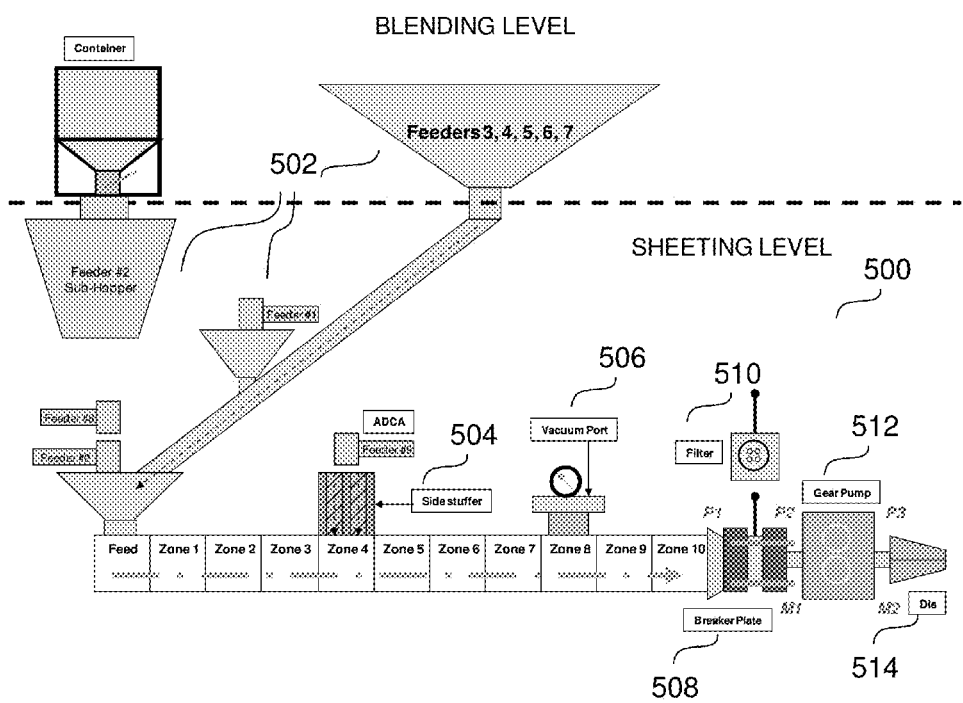
FIG. 5 shows auxiliary components used in the processes to produce compounded extruded structures, according to embodiments of the invention.

FIG. 5 shows auxiliary components used in the overall process to produce compounded extruded structures. The overall process includes a blending level and a sheeting level, for manufacturing extruded structures. Extruder 500 shown in FIG. 5 corresponds to another embodiment of extruder 400 shown in FIG. 4, but FIG. 5 shows additional auxiliary components that are also part of the manufacturing process. Many of the additional auxiliary components shown in FIGS. 4 and 5 are commercially available.

The sheeting level process includes a high speed and high energy input co-rotating twin screw extruder 500. Material ingredients are fed to extruder 500 by using gravimetric loss-in-weight feeders 502. A chemical blowing agent (e.g., ADCA) is fed through side stuffer 504 of extruder 500. Side stuffer 504 may be a standard unit that is sized for particular extruders. Vacuum port 506 is applied to extruder 500 to remove volatiles or air entrapment in the polymer melt. Removing these impurities helps prevent air bubbles or voids in extruded structures that manifests into defects during foaming. Typical vacuum pressures may be 18 to 25 torr, in an absolute vacuum. The vacuum pump can be of dry type or liquid ring type pump which uses chilled process water to maintain a seal.

The melt is filtered through breaker plate 508 that contains filter 510 at the downstream end of extruder 500. Typical filters can be as coarse as 20 mesh or as fine as 250 mesh, which are industry standard screens for plastic extrusion processes. After melt filtration, gear pump 512 (i.e., melt pump) is used to pressurize and maintain a uniform output to extrusion die 514. In some embodiments, extrusion die 514 has a coat-hanger design that makes a sheet profile of uniform thickness and width that is subsequently cast onto a chill roll stack. The liquid crosslinking agent is injected into the upstream end of extruder 500 through an injector. The liquid crosslinking agent is delivered to the injector from a high pressure liquid pump that can be a piston or diaphragm type pump specified for a particular liquid and viscosity.

Extruded structures, such as sheets, are produced without grinding and blending steps by feeding pellets of polypropylene or other resins directly to extruder 500. A chemical blowing agent is introduced into extruder 500, and a liquid crosslinking agent is injected directly into extruder 500. This extrusion process adequately mixes and compounds material ingredients together to achieve a homogenous blend that is well mixed with the blowing agent. The blowing agent is effectively dispersed and distributed throughout the polymer matrix. During the extrusion process, the melt temperature of the polymer is kept below an activation or decomposition temperature of the blowing agent to prevent premature foaming.

The processes and methods described herein can use a co-rotating twin screw extruder that has a longer length to diameter (L/D) ratio than extruders used for conventional methods. That is, the equipment required for pulverizing, blending, and mixing are replaced with additional segments or zones in extruder 500 that can perform these specific operations. For example, when using pulverized resins and pre-blended materials, the L/D is commonly between 20:1 and 24:1 L/D. Unlike conventional processes, an extruder length for direct compounding of an extruded sheet may have an L/D ratio of 36:1 to 52:1, such as 44:1. Thus, pellet resins are fed to a throat of extruder 500, chemical blowing agent is side stuffed into extruder 500, and liquid crosslinking agent is injected directly into extruder 500.

A common way to quantify lengths of extruders is a ratio of barrel length to screw diameter (L/D). For example, if an extruder has an internal screw diameter of 100 mm and a length of 2000 mm, the L/D ratio of this extruder is 20:1 L/D. Axial length of an extruder in addition to a location along the axis can also be represented and reported in diameters. For example, a 100 mm diameter extruder with a 20:1 L/D that is referenced at a location 400 mm from the feed port could be represented as having four screw diameters of length or 4D (4×100 mm). This is a common and convenient way to reference certain locations along an extruder, since many extruders use multiple modular barrels built in lengths of four diameters.

A counter rotating extruder may be used in conventional methods that process a blend comprising the foaming agent to minimize shear and heat so as not to cause premature foaming by inadvertently activating the chemical blowing agent. This corresponds to a premature decomposition of the foaming agent. For example, the extrusion melt temperature of the sheet-like profile is preferably at least 10° C. below the thermal decomposition initiation temperature of the chemical blowing agent.

Figure 6:
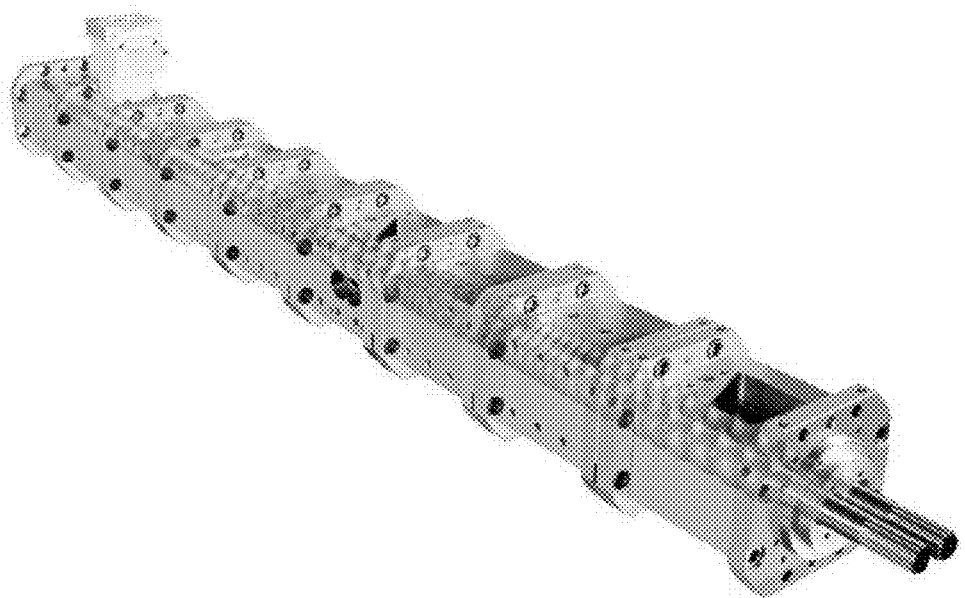
FIG. 6 shows internal parts of a co-rotating extruder, according to embodiments of the invention.
Figure 7:
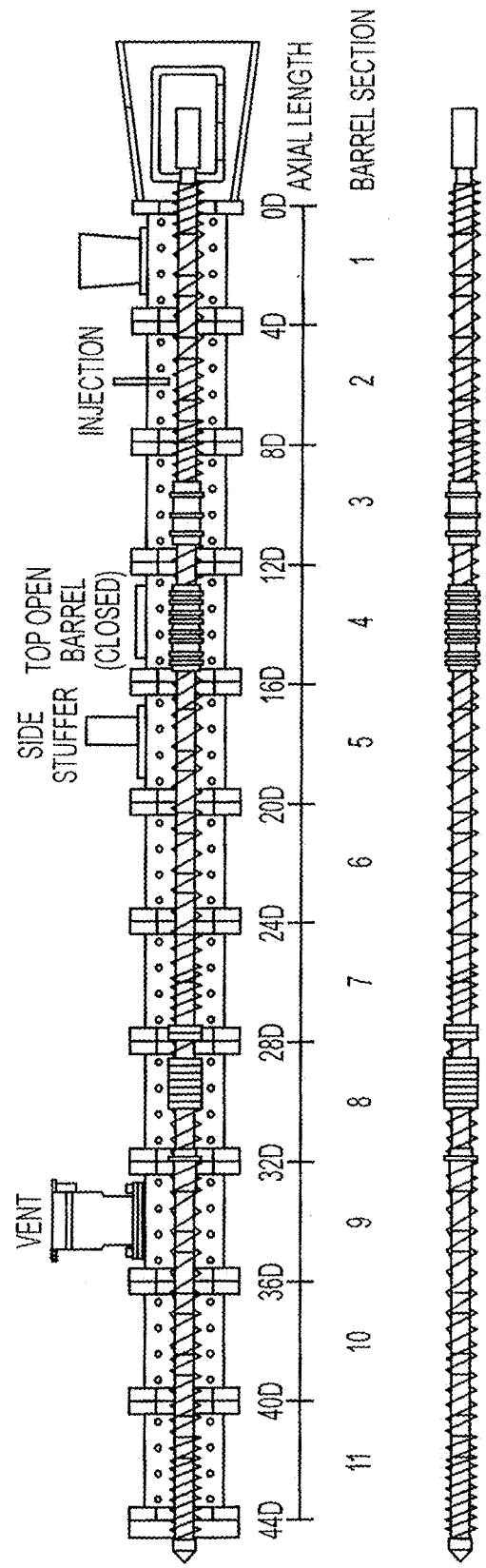
FIG. 7 illustrates the locations of sections and zones in an extruder, according to embodiments of the invention.

FIG. 6 shows internal parts of a typical co-rotating extruder, which, in this example, has a 36:1 (L/D). FIG. 7 depicts detailed about locations and sections or zones, and how to define length of extruder 500. A diameter or size of the extruder can vary, for example, from about 27 mm to 100 mm. An extruder diameter that is small, such as 27 mm, may not produce sufficient output for commercial production. On the other hand, a diameter that is too large (e.g., much greater than 100 mm) may compromise mixing because the number of melt divisions per kilogram of material processed is reduced at a same RPM, because more material is passing through extruder 500. Accordingly, in some embodiments, the diameter of the extruder is preferably about 40-80 mm, or more preferably about 60-100 mm, for commercial production of extruded structures.

Using extruders with L/D ratios that are too low or high may produce defective foams. For example, an L/D ratio of 20:1 may not allow for enough mixing elements in conjunction with metering elements to pump the material. This may result in sheet products that include unmelted materials and/or sheet products of reduced size because of additives that were not uniformly dispersed in the sheet products. These defecting sheet products would manifest into other defects during the final foaming process. On the other hand, for example, an extruder L/D ratio of 60:1 may be too long. An extruder length that is too long may result in too much residence time of the polymer in the extruder. Increased residence time may lead to degradation and premature activation of the chemical foaming agent.

The extruder may have a screw design to sufficiently melt polymer components, as shown in FIG. 7. The extruder achieves a consistent mixture with uniform dispersive and distributive characteristics to obtain a homogenous blend without unmelted portions, large particles, and the like. Removing these defects from the mixture helps eliminate defects that would otherwise manifest during the foaming process.

Figure 13:
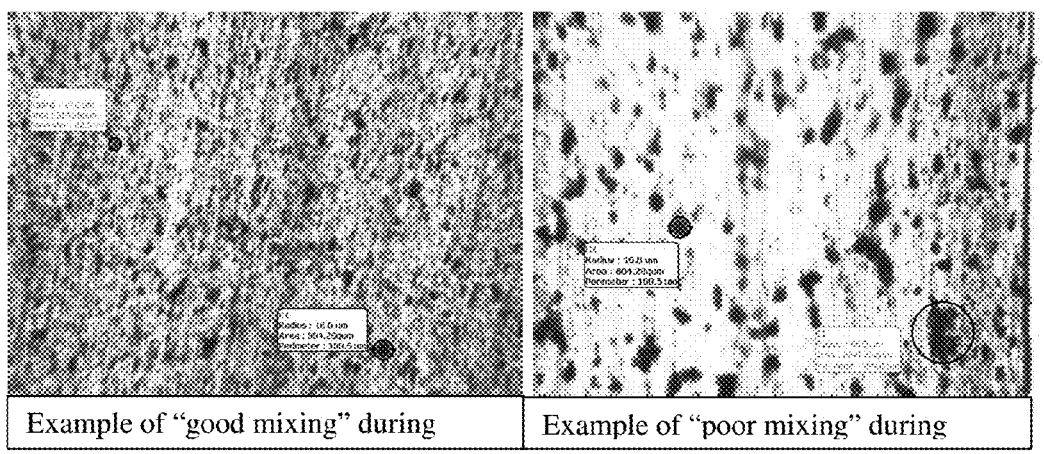
FIG. 13 includes images of cross-sections of sheet structures examined under 100× magnification, according to embodiments of the invention.

FIG. 13 includes images of cross-sections of sheet structures examined under 100× magnification. The image on the left is an example of "good mixing" during extrusion. The radius size of each powder blowing agent domain is equal to or less than about 16 μm, or 32 μm in diameter. The image on the right is an example of "poor mixing" during extrusion. In this case, the domains of the chemical blowing agent are much larger, as large as 46 μm in radius. These large domains of blowing agent cause defects when the sheet is subsequently foamed.

Figure 8:
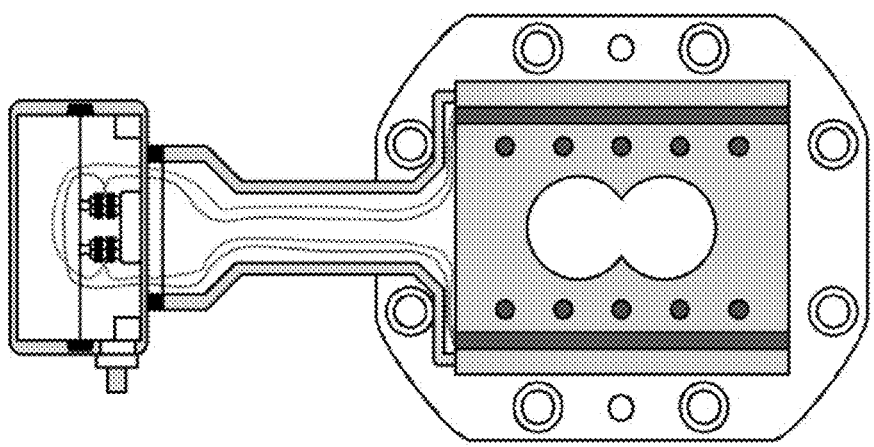
FIG. 8 illustrates heating and cooling features of a barrel segment of extruder, according to embodiments of the invention.

The extrusion process includes different parameters that can be controlled. These parameters include a feed rate, percentage of recipe material components, extruder screw RPM, barrel zone temperatures, and head pressure. Head pressure, as referred to herein, is pressure at the discharge of extruder 500. FIG. 8 depicts heating and cooling features of a barrel segment of extruder 500 that can be used to control barrel temperatures, for example.

Regardless of how the ingredients are fed into the extruder, the shearing force and mixing within the extruder must be sufficient to produce a homogenous an extruded structure having a sheet-like profile. The sheet-like profile may be a film, a web, or a sheet. In some embodiments, a co-rotating twin screw extruder provides sufficient shearing force and mixing through the extruder barrel to extrude a sheet with uniform properties.

The extrusion temperature of the sheet-like profile is preferably at least 10° C. below the thermal decomposition initiation temperature of the chemical blowing agent. If the extrusion temperature exceeds the thermal decomposition temperature of the chemical blowing agent, then the blowing agent will decompose, which will result in undesirable premature foaming.

Resins

Resins fed to extruder 500 may comprise polypropylene, or a blend of polypropylene with other compatible materials. Polyethylene is commonly used when blends are desired. In some embodiments, these two materials are blended together to achieve desired physical properties for which either base resin cannot achieve by itself. The composition can have a synergistic effect by blending two or more materials together. In some embodiments, several polypropylenes may be blended together with multiple polyethylene type materials.

In some embodiments, the extruded structure comprises about 25 to 95 parts by weight of at least one polypropylene based polymer having a melt flow index (MFI) from about 0.1 to 25 grams per 10 minutes at 230° C. and/or at least one polyethylene based polymer having a melt flow index from about 0.1 to 25 grams per 10 minutes at 190° C. In some embodiments, the resin includes 30-80% polypropylene with a balance of polyethylene.

Notably, shear stress is proportional to shear rate viscosity. A melt flow index that is too high causes viscosity of resin to be too low, which results in less shear stress to disperse ingredients during the extrusion process, and which ultimately results in defects during foaming. On the other hand, a melt index that is too low results in viscosity that is too high, which causes shear heating to occur and high extrusion pressure. This can cause premature activation of the foaming agent and poor extrusion output. Therefore, it is preferred to have the melt flow index of polypropylene and polyethylene between 0.5 and 8 grams per 10 minutes, or more preferably between 0.5 and 3.5 grams per 10 minutes.

Resins fed to extruder 500 may be in pellet form because grinding is unnecessary. Typical pellet size varies from about 2 mm in average dimension ((length+width)/2) to about 10 mm, and a common pellet size is approximately 4 mm. Pellet size can also be represented in pellets per gram, and for olefins can vary between 200 and 10 for the given size of 2 mm to 10 mm, respectively. Using smaller pellet sizes can increase the cost of pelletizing. On the other hand, using larger pellets requires more dispersive energy to breakdown and fully melt and homogenize materials during the extrusion process.

Resins are fed to extruder 500 in main feed port 502, or the first barrel segment of extruder 500, within a length of 4D, as shown in FIG. 5. Feeding resins further downstream of extruder 500 may cause unmelted resin in the extruded structures because the resins will bypass the plasticating (i.e., melting and mixing) section of the feedscrews of extruder 500. Therefore, unmelted resin will result in the sheets, which cause defects in the foam.

Polypropylene, as referred to herein, is a polymer resin that includes polypropylene, MAH-g-polypropylene, impact modified polypropylene, polypropylene-ethylene copolymer, MAH-g-polypropylene-ethylene copolymer, metallocene polypropylene, metallocene polypropylene-ethylene copolymer, metallocene polypropylene olefin block copolymer with a controlled block sequence, polypropylene based polyolefin plastomer, polypropylene based polyolefin elastoplastomer, polypropylene based polyolefin elastomer, polypropylene based thermoplastic polyolefin blend and polypropylene based thermoplastic elastomeric blend. Another example of polypropylene is an isotactic homopolypropylene.

Polyethylene, as referred to herein, is a polymer based resin that includes LDPE, MAH-g-LDPE, LLDPE, MAH-g-LLDPE, VLDPE, VLLDPE, HDPE, MAH-g-HDPE, polyethylene-propylene copolymer, MAH-g-polyethylene-propylene copolymer, metallocene polyethylene, MAH-g-metallocene polyethylene, metallocene ethylene-propylene copolymer, MAH-g-metallocene ethylene-propylene copolymer, metallocene polyethylene olefin block copolymer (with a controlled block sequence), EVOH, EVA, MAH-g-EVA, EMA, MAH-g-EMA, EGMA, MAH-g-EGMA, EBA, MAH-g-EBA, EEA, MAH-g-EEA, EAA, and MAH-g-EAA.

An impact modified polypropylene is a homopolypropylene or polypropylene-ethylene-copolymer (random PP copolymer) with ethylene-propylene copolymer rubber. The rubber can be amorphous or semicrystalline but is not in sufficient quantities to render the material any plastomeric or elastomeric properties. Examples of commercially available impact modified polypropylene include TI4015F and TI4015F2, from Braskem PP Americas and Pro-Fax® 8623 and Pro-Fax® SB786 from LyondellBasell.

Polypropylene-ethylene copolymer is polypropylene with random ethylene units. Examples of commercially available polypropylene-ethylene copolymer are 6232, 7250FL, and Z9421 from Total Petrochemicals USA and TR3020F from Braskem PP Americas.

Crosslinking Agent

A crosslinking agent is used to crosslink polypropylene and blends with polyethylene under electron beam irradiation because polypropylene resins will not crosslink on their own. In contrast, certain types of polyethylene, for example, LDPE, VLDPE, and other copolymers, will crosslink without using a crosslinking agent. In some embodiments, polypropylene based foams may include olefin foams containing some portion of PP resin that is crosslinked and could include blends with polyethylene, EVA, or the like.

In some embodiments, a liquid crosslinking agent is injected into extruder 500 at the second barrel section, or directly at or after the feed port 502. In some embodiments, the liquid crosslinking agent can be introduced through a vent opening on extruder 500. Examples of crosslinking agents include divinylbenzene (DVB) or other composition with similar properties.

In some embodiments, a liquid crosslinking agent, such as divinylbenzene (DVB), is injected into the second barrel segment of extruder 500, between the axial location of 4D to 8D. DVB can be used with varying degrees of purity and sourced from different commercial suppliers such as Dow or Nippon. Commercially available DVB usually includes a percentage of DVB with the balance being primarily ethylvinylbenzene (EVB). When using a DVB liquid containing 80% purity (i.e., 80% by wt. is divinylbenzene and 20% ethylvinylbenzene) and making polypropylene foam, the amount injected is usually between 2-4 phr (parts per hundred parts resin). This amount varies depending on the level of crosslinking desired. In some embodiments, the DVB is 2-3% by weight of the material ingredients.

Figure 9:
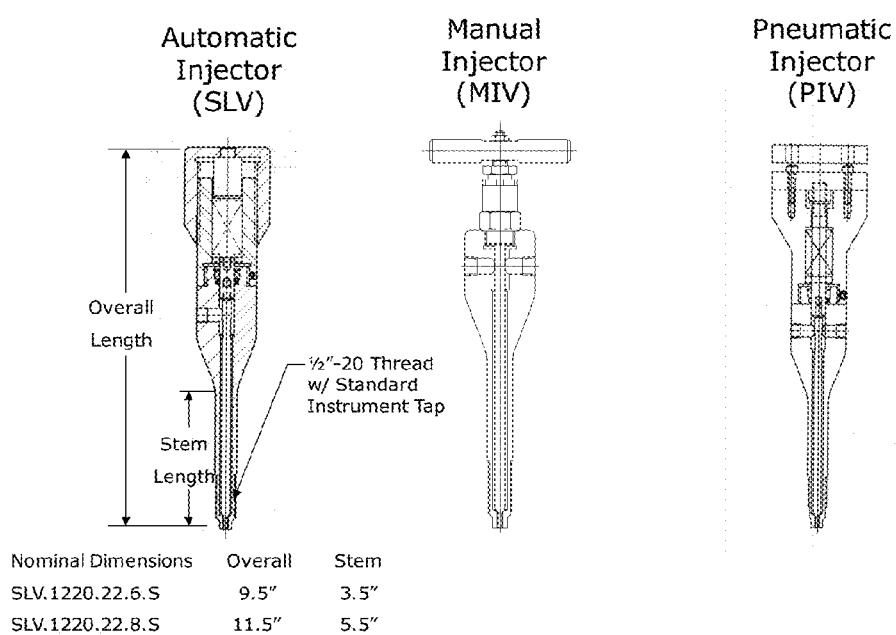
FIG. 9 shows injectors used for injecting a crosslinking agent into an extruder, according to embodiments of the invention.

In some embodiments, DVB is injected using a commercially available injector. FIG. 9 shows injectors that may be used for injecting a crosslinking agent into extruder 500. For example, an injector with a spring loaded valve (SLV) and a cooling jacket to prevent the DVB from polymerizing due to heat could be used, as shown on the left of FIG. 9. In particular, an SLV series injector from Specialty Extrusion Solutions could be used. In some embodiments, other types of valves can be used to inject DVB into the extruder. For example, a manual valve with adjustable flow could be used, as shown on the middle of FIG. 9. Another type of valves that can be used include pneumatic, as shown on the right side of FIG. 9. Other types of valves that can be used include a block or port that has a specified hole sufficient to pump the liquid DVB into the extruder under high pressure.

Spring loaded valves may also use pressure activated injection. Standard valves function over a pressure range of 50 to 1500 psig and open, at preset pressures. This configuration offers consistent process control. The valve may include a calibration curve that allows precise injection pressure adjustment.

Figure 10:
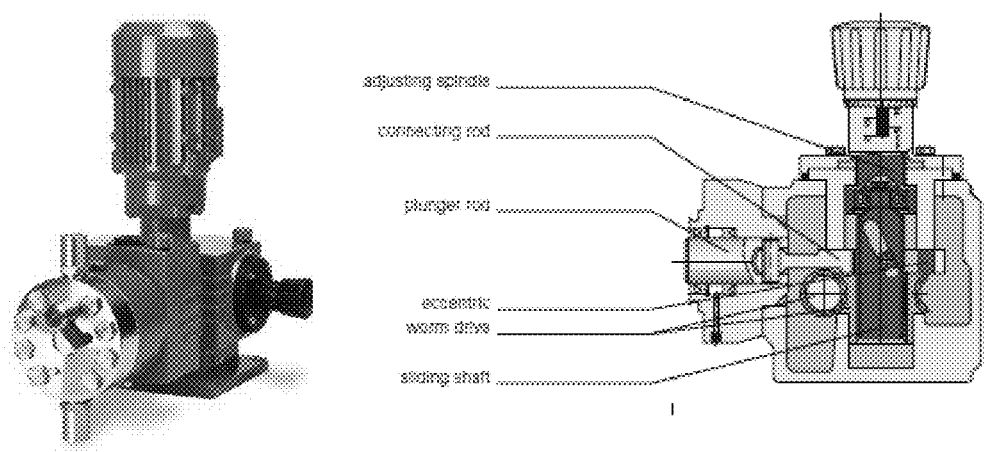
FIG. 10 shows an example of a liquid diaphragm pump, according to embodiments of the invention.

In some embodiments, the liquid crosslinking agent can be pumped into the extruder using a diaphragm pump. The internal components and seals of the diaphragm pump may have resistivity to chemicals such as DVB. Diaphragm pumps are commercially available, such as the Lewa LDC diaphragm pump. FIG. 10 shows an example of a liquid diaphragm pump.

Insufficient dispersion of the liquid DVB may occur if it is injected after the plasticating section of the screw, such as after 16D. This may result in localized concentrations of liquid DVB in extruded structures that will manifest into inconsistent levels of crosslinking in during irradiation and defects during foaming such as bubbles or blisters.

Figure 11:
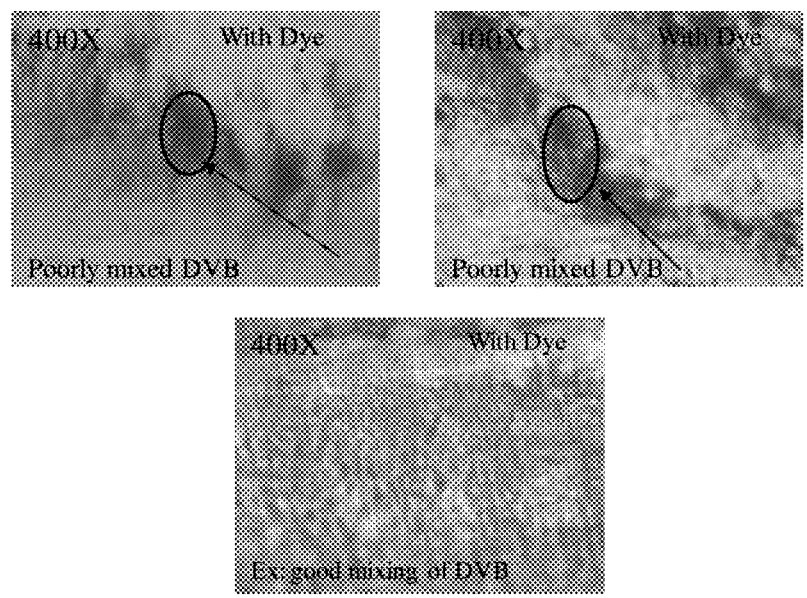
FIG. 11 includes images of poor and good mixing of DVB depending on injection location in an extruder barrel, according to embodiments of the invention.

FIG. 11 includes images of poor and good mixing of DVB depending on the injection location of an extruder barrel. The two upper pictures show poorly mixed DVB. In these examples, the liquid DVB was dyed with a black dye and injected after 16D without any blowing agent present. The resulting compounded sheet was then examined under a microscope at 400× magnification to qualitatively ascertain how well the DVB was mixed (i.e., dispersed) within the base polymer. It is clear that injecting after 16D resulted in large domains of DVB that were not dispersed or mixed very well within the base polymers.

In addition, if the liquid is injected into a section of the extruder under pressure, the pump must overcome this melt pressure to prevent the injector from clogging or plugging with polymer. If the DVB is injected between 4D and 12D, good mixing and dispersion of the DVB will be achieved. The image on the bottom of FIG. 11 shows good mixing of DVB, as a result of injecting between 4D and 12D. No large domains of dyed DVB can be seen in this example.

Figure 12:
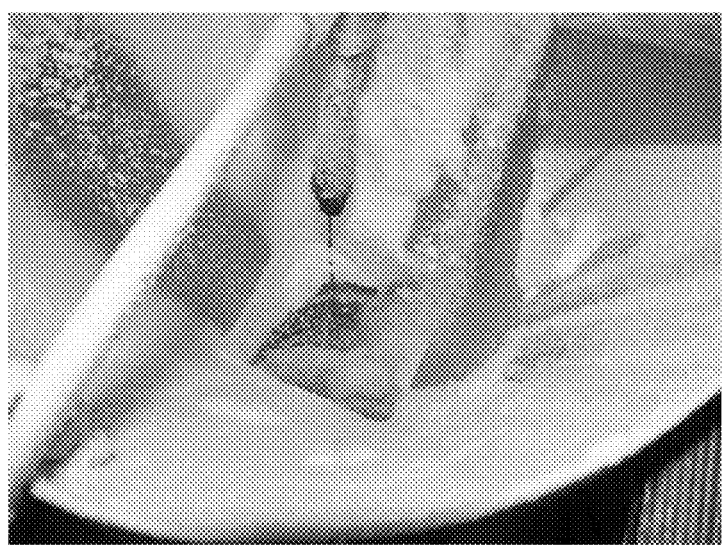
FIG. 12 is an image showing the injection of liquid crosslinking agent into the extruder at a position between 0 and 4D, according to embodiments of the invention.

If the DVB is added directly into the feed between 0 and 4D, good dispersion may be achieved, however, it can wet the feed area causing polymer and other materials to stick and break off in clumps. In addition, it can have a tendency to pool and accumulate at the bottom of the barrel. FIG. 12 shows injecting or delivering the liquid crosslinking agent at a location between 0 and 4D. Therefore, in some embodiments, injecting the liquid DVB into extruder between 4D and 12D is preferred, and between 4D and 8D is more preferred to allow proper dispersion of the liquid within the polymer by subjecting it to the high shear plasticating section of the screws and not allowing the liquid to pool in the feed area.

Other suitable crosslinking monomers include commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. These crosslinking monomers may be used alone or in combinations thereof.

Different methods may be used to compound and extrude structures, especially when using crosslinking agents other than DVB. For example, crosslinking agents may be solids rather than liquids, which may not be added to a mixture of material ingredients. If a solid crosslinking agent is added to the mixture, it is still desirable to pulverize the resin to get a homogenous blend between the resin and powder blowing agent. However, using a DVB liquid as a crosslinking agent provides a more uniform and controlled crosslinking compared to using solid crosslinking agents.

Blowing Agent

In some embodiments, a chemical blowing agent (i.e., foaming agent) is fed through side stuffer 504 to extruder 500 at a fifth barrel segment, between 16D and 20D along the axial length. In particular, the chemical blowing agent is fed above by a gravimetric loss-in-weight feeder. In some embodiments, side stuffing could be bypassed by introducing the chemical blowing agent into a throat or feed section of the extruder, which corresponds to the first barrel segment between 0 and 4D. However, bypassing the side stuffer increases the likelihood of prematurely activating the foaming agent in plasticating (melting and mixing) section. The plasticating section of extruder 500 provides aggressive kneading discs that create dispersive shear to melt the polymer in barrel sections two and three, and in turn create viscous generation of heat. If the mixing elements of the screw are altered to lessen heat generation, inadequate melting of the resin can occur for high melting point and high viscosity resins, in addition to creating a "poor mixing" condition with respect to the blowing agent, as shown in FIG. 13. Therefore, adding the chemical blowing agent in the feed section (e.g., first barrel section) is not preferred.

On the other hand, adding the chemical blowing agent too far downstream between 24D and 32D (e.g., seventh or eighth segment) does not allow for proper distributive mixing of the agent, resulting in large concentrations or clumps that will manifest into defects during the foaming process. Therefore, side stuffing the chemical blowing agent is preferred between 16D and 26D, or more preferably between 16D and 20D to achieve "good mixing" and proper incorporation into the polymer melt without premature activation or decomposition. Introducing the foaming agent in these zones of the extruder facilitates "good mixing" and incorporation without premature activation or decomposition to avoid the "poor mixing" shown in FIG. 13.

Any type of chemical blowing agent may be used in the extrusion process disclosed herein. Examples of chemical blowing agents include azo compounds, hydrazine compounds, carbazides, tetrazoles, nitroso compounds and carbonates. A chemical blowing agent may be employed alone or in any combination. Other examples of chemical blowing agents include powdered exothermic azodicarbonamide (ADCA), endothermic acid-carbonate system, or combinations thereof.

In some embodiments, azodicarbonamide (ADCA) is used as the chemical blowing agent. The thermal decomposition of ADCA typically occurs at temperatures between 190 to 230° C. Accordingly, extruding temperature is maintained at or below 190° C. to prevent ADCA from thermally decomposing in the extruder. The particle size of ADCA is usually between 9-50 microns depending on grade.

ADCA is a preferred blowing agent over acid-carbonate systems due to a higher gas volume generated. As a result, less blowing agent is required for the same expansion compared to an endothermic acid-carbonate system. In some embodiments, a percentage of blowing agent used is between 1-30 parts per hundred parts resin (phr) for the production of irradiation crosslinked polypropylene foam. In some embodiments, the amount of ADCA is 3-20% parts by weight of the material ingredients A lower temperature limit for extrusion is that of the polymer with the highest melting point. If the extrusion temperature drops below the melting temperature of the polymer with the highest melting point, then undesirable "unmelts" appear in the sheet-like profile. Upon foaming, an extruded sheet-like profile that was extruded below this lower temperature limit will exhibit uneven thickness, a non-uniform cell structure, pockets of cell collapse, and other undesirable attributes.

If the difference between a decomposition temperature of a thermally decomposable blowing agent and a melting point of a polymer with a highest melting point is large, then a catalyst for a blowing agent decomposition may be used. Exemplary catalysts include, but are not limited to, zinc oxide, magnesium oxide, calcium stearate, glycerin, and urea.

Irradiation

In the irradiation step, the extruded structure is subjected to irradiation with ionizing radiation at a given exposure to crosslink the composition, thereby obtaining a crosslinked sheet.

Crosslinking is a process of bonding polymer chains to each other. Crosslinks may be generated using a variety of different techniques and can be formed both intermolecularly, between different polymer molecules, and intramolecularly between portions of a single polymer molecule. Such techniques include providing crosslinking monomers which are separate from a polymer chain and providing polymer chains which incorporate a crosslinking monomer containing a functional group that can form a crosslink or be activated to form a crosslink.

An extruded structure is subjected to irradiation with ionizing radiation at a given exposure to crosslink the composition, thereby obtaining a crosslinked extruded structure. Ionizing radiation produces an extruded structure with an excellent surface appearance and uniform cells. A crosslinking monomer may be added to promote crosslinking because ionizing radiation alone is unable to produce a sufficient degree of crosslinking on polypropylene(s), polypropylene based materials, some polyethylene(s), and some polyethylene based materials.

Examples of ionizing radiation include, but are not limited to, alpha rays, beta rays, gamma rays, and electron beams. Among them, an electron beam having uniform energy is preferably used to prepare irradiated extruded structures. Exposure time, frequency of irradiation and acceleration voltage upon irradiation with an electron beam can vary widely depending on an intended crosslinking degree and thickness of the extruded structure. However, it should generally be in the range of about 10 to 500 kGy, and preferably from about 20 to 300 kGy, and more preferably from about 20 to 200 kGy.

If the exposure to radiation is too low, then cell stability is not maintained upon foaming. If the exposure is too high, the moldability of the resulting foam sheet may be poor. Moldability, as referred to herein, is a desirable property when the foam sheet is used in thermoforming applications. The polymer components will also be degraded from excessive polymer chain scission. Also, the extruded structure profile may be softened by exothermic heat release upon exposure to electron beam radiation such that the structure can deform with excessive exposure.

The irradiation frequency is preferably no more than four times, more preferably no more than two times, and even more preferably just one time. If the irradiation frequency is more than about 4 times, then the polymer components may suffer degradation so that upon foaming, for example, uniform cells will not be created in the resulting foam composition.

When the thickness of the sheet-like profile is greater than about 4 mm, irradiating each primary surface of the profile with an ionized radiation is preferred to make the degree of crosslinking of the primary surface(s) and the inner layer more uniform.

Irradiation with an electron beam provides an advantage in that sheet-like profiles having various thicknesses can be effectively crosslinked by controlling an acceleration voltage of electrons. The acceleration voltage is generally in the range of about 200 to 3000 kV, and preferably from about 400 to 1200 kV, and more preferably from about 600 to 1000 kV.

If the acceleration voltage is less than about 200 kV, then radiation cannot reach the inner portion of the sheet-like profile. As a result, the cells in the inner portion may be coarse and uneven upon foaming. Additionally, acceleration voltage that is too low for a given thickness profile will cause arcing, resulting in "pinholes" or "tunnels" in the foamed sheet. On the other hand, the polymers may degrade, and the proper dose as a function of cross section may not be achieved, if the acceleration voltage is greater than about 1500 kV.

Regardless of the type of ionizing radiation selected, crosslinking is performed so that the composition is crosslinked from 20 to 75% and more preferably from 30 to 60%, as measured by the "Toray Gel Fraction Method" and detailed in the sections below.

Foaming

Foaming may be performed by heating the crosslinked structure with molten salt, radiant heaters, vertical hot air oven, horizontal hot air oven, microwave energy, or any combinations thereof, to activate the foaming agent (i.e., chemical blowing agent) in the extruded structure to expand the polymer of the structure. In some embodiments, the foaming may be conducted in an impregnation process using, for example, nitrogen in an autoclave, followed by a free foaming via molten salt, radiant heaters, vertical hot air oven, horizontal hot air oven, microwave energy or any combinations thereof.

In some embodiments, a combination of molten salt and radiant heaters is used to heat a crosslinked sheet-like profile. In some embodiments, the crosslinked sheet-like profile can be softened with preheating before foaming. Pre-heating helps stabilize the expansion of the sheet-like material upon foaming.

Foaming is performed by heating the crosslinked extruded structure to a temperature higher than the decomposition temperature of the thermally decomposable blowing agent. For the thermally decomposable blowing agent ADCA, foaming is performed in a continuous process at a temperature of about 200 to 260° C. or preferably at about 220 to 240° C. A continuous foaming process is preferred over a batch process for production of a continuous foam sheet.

Foams produced using the methods and processes described herein can have a section or overall density of about 20 to 250 $kg/m^3$, or preferably from about 30 $kg/m^3$ to 125 $kg/m^3$, as measured by JIS K6767. The section density can be controlled by an amount of blowing agent and the thickness of the extruded structure profile. If the density of a sheet is less than about 20 $kg/m^3$, then the sheet does not foam efficiently due to a large amount of chemical blowing agent needed to attain the desired density. Consequently, it becomes increasingly difficult to control expansion, control uniform section density and thickness, and prevent cell collapse.

Foam compositions are not limited to a section density of 250 $kg/m^3$. A foam composition of 350 $kg/m^3$, 450 $kg/m^3$, or 550 $kg/m^3$ may also be produced. However, a foam composition having a density of less than 250 $kg/m^3$ is preferred because greater densities are cost prohibitive when compared to other materials which can be used for the same applications.

Foam compositions discussed herein have closed cells. Preferably, at least 90% of the cells have undamaged cell walls, more preferably at least 95%, even more preferably more than 98%. The average cell size is preferably from 0.05 to 1.0 mm, and most preferably from 0.1 to 0.7 mm. If the average cell size is lower than 0.05 mm, then the foam density is typically greater than 250 $kg/m^3$. If the average cell size is larger than 1 mm, the foam will have an uneven surface. There is also a possibility of the foam composition being undesirably torn if the population of cells in the foam does not have a preferred average cell size where the foam is stretched or portions are subjected to a secondary process. In some embodiments, the cell size in a foam composition may have a bimodal distribution representing a population of cells in the core of the foam composition which are relatively round and a population of cells in the skin, near the surfaces of the foam composition, which are relatively flat, thin, and/or oblong.

In some embodiment, the thickness of the foam composition can be about 0.2 mm to 50 mm, preferably from about 0.4 mm to about 40 mm, more preferably from 0.6 mm to 30 mm, and even more preferably from 0.8 mm to 20 mm. If thickness is less than 0.2 mm, then foaming is not efficient due to significant gas loss from primary surfaces. If thickness is greater than about 50 mm, it is increasingly difficult to control expansion, and produce a structure with uniform section density and thickness.

In some embodiments, the extruded structure may be subjected to secondary processes, including but not limited to, embossing, corona or plasma treatment, surface roughening, surface smoothing, perforation or microperforation, splicing, slicing, skiving, layering, bonding, hole punching, and the like. A desired thickness of an extruded structure, such as a sheet, can be obtained by slicing, skiving, or bonding to produce a thickness of 0.1 mm to about 100 mm.

The foam composition may also contain other compatible additives. Common additives include, but are not limited to, organic peroxides, antioxidants, lubricants, thermal stabilizers, colorants, flame retardants, antistatic agents, nucleating agents, plasticizers, antimicrobials, antifungals, light stabilizers, UV absorbents, anti-blocking agents, fillers, deodorizers, thickeners, cell size stabilizers, metal deactivators, and combinations thereof.

Measurements

Properties of materials described herein are measured according to the following.

Crosslinking is measured by using the "Toray Gel Fraction Method." According to this method, tetralin solvent dissolves non-crosslinked material and a crosslinking degree is expressed as weight percentage of crosslinked material.

An apparatus used to determine a percent of polymer crosslinking includes a 100 mesh, 0.0045 inch wire diameter; Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used to determine a percent of crosslinking include tetralin high molecular weight solvent, acetone, and silicone oil.

In particular, the weight of an empty wire mesh bag is measured and recorded. For each sample, about 100 milligrams±about 5 milligrams of sample is weighed and transferred to the wire mesh bag. The weight of the wire mesh bag and the sample, typically in the form of foam cuttings, is recorded. Each bag is attached to the corresponding number wire and clips. When the solvent temperature reaches 130° C., the combination of bag and sample is immersed in the solvent. The samples are shaken up-and-down about 5 or 6 times to loosen any air bubbles and fully wet the samples. The samples are attached to an agitator and agitated for three hours for the solvent to dissolve the foam. The samples are then cooled in a fume hood.

The samples are washed by shaking up-and-down about 7 or 8 times in a container of primary acetone. The samples are washed a second time in a second acetone wash. The washed samples are washed once more in a third container of fresh acetone. The samples are then hanged in a fume hood for about 1 to about 5 minutes to evaporate the acetone. The samples are then dried in a drying oven for about 1 hour at 120° C. The samples are cooled for a minimum of about 15 minutes. The wire mesh bag is weighed on an analytical balance and the weight is recorded.

Crosslinking is then calculated using the formula 100* (C−A)/(B−A), where A=empty wire mesh bag weight; B=wire bag weight+foam sample before immersion in tetralin; and C=wire bag weight+dissolved sample after immersion in tetralin.

The melt flow index (MFI) value for a polymer is defined and measured according to ASTM D1238 at 230° C. for polypropylenes and polypropylene based materials, and at 190° C. for polyethylene and polyethylene based materials using a 2.16 kg plunger for 10 minutes. The test time may be reduced for relatively high melt flow resins.

MFI provides a measure of flow characteristics of a polymer and is an indication of the molecular weight and processability of a polymer material. If MFI values are too high, which corresponds to a low viscosity, extrusion according to the present disclosure cannot be satisfactorily carried out. Problems associated with MFI values that are too high include low pressures during extrusion, problems setting the sheet thickness profile, uneven cooling profile due to low melt viscosity, poor melt strength and/or machine problems. MFI values that are too low include high pressures during melt processing, calendering, sheet quality and profile problems, and higher extrusion temperatures which cause a risk of foaming agent decomposition and activation.

MFI is a good measurement for foaming because it reflects viscosity of a material, and viscosity has an effect on the foaming. Achieving a particular MFI value renders an effective foam composition. A lower MFI material may improve physical properties because molecular chain length is higher, which creates more energy needed for chains to flow when a stress is applied. Moreover, a longer molecular chain (MW) has more components that can crystallize to provide more strength through intermolecular ties. However, an MFI that is too low will cause viscosity to become too high.

Polymers with higher MFI values have shorter chains. Consequently, a volume of a material with higher MFI values has more chain ends relative to polymers having a lower MFI, which can rotate and create free volume due to the space needed for such rotation. For example, rotation occurring above the Tg or glass transition temperature of the polymer. This increases the free volume and enables easy flow under stress forces. For this disclosure, the MFI should be within the described ranges to provide an appropriate compromise between these properties.

Particle size distribution is measured according to ASTM D5644. In particular, material is sieved and amounts that are captured in a particular mesh size (e.g., 10, 16, 30, 50, 80 and 100 mesh, and what is captured in a bottom pan) are reported as percentages.

Specific Energy is defined as energy applied in kilowatts to material being processed by extruder 500, normalized per kilogram. Essentially, specific energy is an indicator of how much work is being applied during extrusion and the intensity of the extrusion process. Applied and specific energy are calculated as follows:

$$\text{Specific Energy} = \frac{\text{KW(applied)}}{\text{feedrate}\left(\frac{\text{kg}}{\text{hr}}\right)}$$

$$\text{KW(applied)} = \frac{\text{KW(motor rating)} * (\% \text{ torque from maximum allowable}) * \text{RPM(actual running RPM)}}{\text{Max RPM (capability of extruder)} * 0.97 \text{ (gearbox efficiency)}}$$

A density of an extruded structure, such as a sheet, is defined and measured using section or overall density, rather than a core density, according to JIS K6767.

EXAMPLES

Example 1

An extruded sheet is directly compounded on a 44:1 L/D co-rotating twin screw extruder using the raw material recipe shown in the TABLE labeled "Example 1: Recipe" below that will be irradiated and foamed to produce a foam with a density of 67 kg/m3, a thickness of 2.5 mm, and crosslinking value of 40%. The polypropylene, polyethylene, antioxidant masterbatch, and additive are fed into the feed section (i.e., the first barrel segment or location 0-4D) using loss-in-weight feeders at a rate that is proportional to the size of extruder being used. The ADCA is feed between 16D and 20D using a side stuffer, and the DVB injected into the barrel between 4D and 8D using an SLV type injector operating at a pressure of 500 psig.

The conditions to compound and extrude the sheet in Example 1 are shown in the following extrusion parameters TABLE labeled "Example 1: Extrusion Parameters." A 20/40 filter pack was used in this example, and the melt extruded through a 2.0 mm die gap opening to produce a compounded sheet with a thickness of 1.400 mm. The temperatures of each barrel zone, the melt adaptors, gear pump, and die are also indicated in the table below. The inlet pressure to the gear pump is set to maintain a pressure of 550 psi. The extruder RPM is set to a value of 78 to achieve a sufficient number of melt divisions and achieve sufficient dispersive and distributive mixing so the no defects occur during foaming. Under these operating conditions the melt temperature of the resin during extrusion is approximately 355° F. as measured after the filter pack and before the gear pump, and load on the drive is 52%. The specific energy imparted to the polymer blend in this example is 0.141 KW/(kg/hr).

Example 1: Recipe

| Raw Mat | % of blend |
|---|---|
| Polypropylene: commercially available pellet random copolymer w/ MFI of 2.0 g/10 min (230° C., 2.16 kg), melting temperature between 145-150° C. | 34.2% |
| Polyethylene: commercially available pellet with controlled block sequence w/ MFI of 1.0 g/10 min (190° C., 2.16 kg) with a melting temperatrure between 119-123° C. | 51.3% |
| Antioxidant masterbatch: LDPE carrier resin containing 14% active antioxidant blend by weight comprised of basic commercially available phenolic and phosphite type antioxidants for plastic extrusion. MFI between 9-17 g/10 min (190° C., 2.16 kg) | 4.7% |
| ADCA (azodicarbonamide) chemical foaming agent | 6.2% |
| DVB (divinylbenzene): commercially available 80% purity | 1.9% |
| Additive: process aid to reduce build up during extrusion compounded into LDPE carrier resin, active ingredients 3.5% of masterbatch w/ MFI of 5.0 g/10 min (190° C., 2.16 kg). | 1.7% |
| Total | 100.00% |

Example 1: Extrusion Parameters

| FILTER Pack (mesh) | | 20/40 |
|---|---|---|
| Initial Die Lip Gap | | 2.0 |
| | Unit | Set |
| Sheet Thickness Target | μm | 1400 |
| | Unit | Setpoint |
| Feed Zone | ° F. | — |
| Zone #1 | ° F. | 375 |
| Zone #2 | ° F. | 385 |
| Zone #3 | ° F. | 375 |
| Zone #4 | ° F. | 350 |
| Zone #5 | ° F. | 300 |
| Zone #6 | ° F. | 275 |
| Zone #7 | ° F. | 265 |
| Zone #8 | ° F. | 250 |
| Zone #9 | ° F. | 235 |
| Zone #10 | ° F. | 235 |
| Adaptors | ° F. | 325 |
| GP (Gear Pump) | ° F. | 345 |
| Die Temperature | ° F. | 355 |
| Extruder RPM | RPM | 78 |
| Target GP Inlet Pressure | psi | 550 |

Example 2

An extruded sheet is directly compounded on a 44:1 L/D co-rotating twin screw extruder using the raw material recipe shown in the TABLE labeled "Example 2: Recipe" below that will be irradiated and foamed to produce a foam with a density of 50 kg/m3, a thickness of 2.0 mm, and crosslinking value of 40%. The polypropylene, polyethylene, antioxidant masterbatch, and additive are fed into the feed section (1st barrel segment or location 0-4D) using loss-in-weight feeders at a rate that is proportional to the size of extruder being used. The ADCA is feed between 16D and 20D using a side stuffer, and the DVB injected into the barrel between 4D and 8D using an SLV type injector operating at a pressure of 500 psig.

The conditions to compound and extrude the sheet in Example 2 are shown in the following extrusion parameters TABLE labeled "Example 2: Extrusion Parameters." A 20/60 filter pack was used in this example, and the melt extruded through a 1.2 mm die gap opening to produce a compounded sheet with a thickness of 0.850 mm. The temperatures of each barrel zone, the melt adaptors, gear pump, and die are also indicated in the table below. The inlet pressure to the gear pump is set to maintain a pressure of 550 psi. The extruder RPM is set to a value of 98 to achieve a sufficient dispersive and distributive mixing to prevent defects during the foaming process. The higher melting temperature PP resin compared to Example 1 requires more screw speed to achieve proper mixing and melting of the resin, otherwise unmelts would occur in the compounded sheet. Under these operating conditions the melt temperature of the resin during extrusion is approximately 365° F. as measured after the filter pack and before the gear pump, and load on the drive is 47%. The specific energy imparted to the polymer blend in this example is 0.150 KW/(kg/hr), which is higher than Example 1.

Example 2: Recipe

| Raw Mat | % of blend |
|---|---|
| Polypropylene: commercially available pellet "mini random homopolymer" w/ MFI of 3.5 g/10 min (230° C., 2.16 kg), melting temperature between 155-158° C. | 48.7% |
| Polyethylene: commercially available pellet LLDPE w/ MFI of 6.8 g/10 min (190° C., 2.16 kg) with a melting temperatrure between 120-124° C. | 32.5% |
| Antioxidant masterbatch: LDPE carrier resin containing 14% active antioxidant blend by weight comprised of basic commercially available phenolic and phosphite type antioxidants for plastic extrusion. MFI between 9-17 g/10 min (190° C., 2.16 kg) | 4.3% |
| ADCA (azodicarbonamide) chemical foaming agent | 9.6% |
| DVB (divinylbenzene): commercially available 80% purity | 2.5% |
| Additive: process aid to reduce build up during extrusion compounded into LDPE carrier resin, active ingredients 3.5% of masterbatch w/ MFI of 5.0 g/10 min (190° C., 2.16 kg) | 2.4% |
| Total | 100.00% |

Example 2: Extrusion Parameters

| FILTER Pack (mesh) | | 20/60 |
|---|---|---|
| Initial Die Lip Gap | | 1.2 |
| | Unit | Set |
| Sheet Thickness Target | μm | 850 |
| | Unit | Setpoint |
| Feed Zone | ° F. | — |
| Zone #1 | ° F. | 365 |
| Zone #2 | ° F. | 390 |
| Zone #3 | ° F. | 390 |
| Zone #4 | ° F. | 360 |
| Zone #5 | ° F. | 300 |
| Zone #6 | ° F. | 300 |
| Zone #7 | ° F. | 285 |
| Zone #8 | ° F. | 275 |
| Zone #9 | ° F. | 260 |
| Zone #10 | ° F. | 260 |
| Adaptors | ° F. | 325 |
| GP (Gear Pump) | ° F. | 350 |
| Die Temperature | ° F. | 355 |
| Extruder RPM | RPM | 98 |
| Target GP Inlet Pressure | psi | 550 |

Foam compositions disclosed herein can be used for a variety of additional applications. A soft and flexible foam composition can be used as a tape or gasket to seal double-pane windows, handheld electronic devices, and household appliances. A firm and rigid foam may be thermoformed for applications such as an automobile air duct.

In some embodiments, foam compositions can be combined with different layers such as, for example, a film and/or foil layer. The foam may be laminated on one or both sides with these materials and may comprise multiple layers. Layers may be joined by chemical bonds, mechanical means, electromagnetic charges, hydrophobic or hydrophilic attractions, or combinations thereof. The foam composition and laminate composition can be used for automobile interior parts such as door panels, armrests, center consoles, seats, and the like.

In some embodiments, foam compositions can also be used in furniture, room partitions, casing, flooring, and the like. Pressure sensitive adhesives such as are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives, rubber based adhesives, and combination thereof may be used. A foam layer acts as a sealant and cushion that provides a uniform surface.

The above description includes several numerical ranges in the text and figures. The numerical ranges support any range or value within the disclosed numerical ranges even though a precise range limitation is not stated verbatim in the specification because embodiments of the invention can be practiced throughout the disclosed numerical ranges.

The term "consist essentially of" means that the composition consists almost exclusively of the specified components except that additional unspecified component substances which do not materially affect the basic and novel characteristics of this invention can also be present. For example, the blended mixture may include stabilizers, colorants, antioxidants and other additives as required in such amounts that do not impair inherent performance thereof.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. The entire disclosure of the patents and publications referred in this application are hereby incorporated herein by reference. Finally, the invention can be construed according to the claims and their equivalents.

The invention claimed is:

1. A method of manufacturing an extruded structure, comprising:
   introducing resin into a feeder of an extruder;
   injecting a liquid crosslinking agent into the extruder using an injector at a location downstream of the feeder within 4 to 8 screw diameters of an axial length of the extruder;
   introducing a chemical blowing agent into the extruder at a location downstream of the location where the liquid crosslinking agent is injected into the extruder; and
   extruding a structure from the extruder.

2. The method of claim 1, further comprising irradiating the extruded structure to produce a crosslinked extruded structure.

3. The method of claim 2, further comprising foaming the crosslinked extruded structure to produce a foam structure.

4. The method of claim 3, wherein the foaming includes pre-heating the crosslinked extruded structure.

5. The method of claim 4, wherein the foaming includes using a salt bath as a heat source to activate the chemical blowing agent in the crosslinked extruded structure.

6. The method of claim 3, wherein the foaming includes using at least one of a radiant heater, a hot air oven, or microwave energy as a heat source to activate the chemical blowing agent in the crosslinked extruded structure.

7. The method of claim 3, wherein the foam has a density of 20 to 250 $kg/m^3$.

8. The method of claim 1, wherein the chemical blowing agent is introduced into the extruder through a side stuffer downstream of a location where the liquid crosslinking agent is injected into the extruder.

9. The method of claim 1, wherein the resin introduced into the feeder has a non-powder form.

10. The method of claim 9, wherein the resin is formed as pellets, granules, chips, flakes, beads, cylinders, or tubes.

11. The method of claim 10, wherein the resin comprises a polypropylene based polymer comprising MAH-g-polypropylene, impact modified polypropylene, polypropylene-ethylene copolymer, MAH-g-polypropylene-ethylene copolymer, metallocene polypropylene, metallocene polypropylene-ethylene copolymer, metallocene polypropylene olefin block copolymer with a controlled block sequence, polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

12. The method of claim 1, wherein the extruded structure has a sheet-like profile and is at least one of a film, a web or a sheet.

13. The method of claim 1, wherein the extruding is performed with a co-rotating, twin screw extruder.

14. The method of claim 13, wherein the extruder has a length to screw diameter ratio of 36:1 to 52:1.

15. The method of claim 14, wherein each twin screw has a diameter of 60 to 100 mm.

16. The method of claim 13, wherein the extruder has a length greater than 20 screw diameters.

17. The method of claim 16, wherein the feeder is located within an initial 4 screw diameters and the blowing agent is introduced into the extruder within 16 to 20 screw diameters.

18. The method of claim 1, wherein a temperature within the extruder is maintained at least 10 degrees Celsius below a thermal decomposition initiation temperature of the chemical blowing agent.

19. The method of claim 1, wherein the chemical blowing agent has domains each of a radius size less than 16 μm in the extruded structure.

20. The method of claim 1, wherein the liquid crosslinking agent comprises divinylbenzene.

21. The method of claim 1, wherein the chemical blowing agent is azodicarbonamide.

22. A method for manufacturing an extruded structure, comprising:
   introducing resin at a first zone of the extruder;
   injecting a liquid crosslinking agent at a second zone of the extruder using an injector, wherein the second zone is downstream of the first zone and within 4 to 8 screw diameters of an axial length of the extruder;
   introducing a chemical blowing agent at a third zone of the extruder; and
   extruding a structure at a fourth zone of the extruder.

23. The method of claim 22, further comprising irradiating the extruded structure to crosslink the resin of the extruded structure.

24. The method of claim 23, further comprising foaming the irradiated crosslinked structure to produce a foam structure.

25. The method of claim 22, wherein the third zone is downstream of the second zone.

26. The method of claim 22, wherein the extruded structure comprises 30 to 80% polypropylene.

27. The method of claim 22, wherein the crosslinked composition comprises a crosslinking degree of 20 to 75%.

28. The method of claim 22, wherein the extruding is performed with a co-rotating, twin screw extruder having a length greater than 20 screw diameters, the first zone is within the initial 4 screw diameters, and the third zone is within 16 to 20 screw diameters.

\* \* \* \* \*